United States Patent Office 3,157,244
Patented Nov. 17, 1964

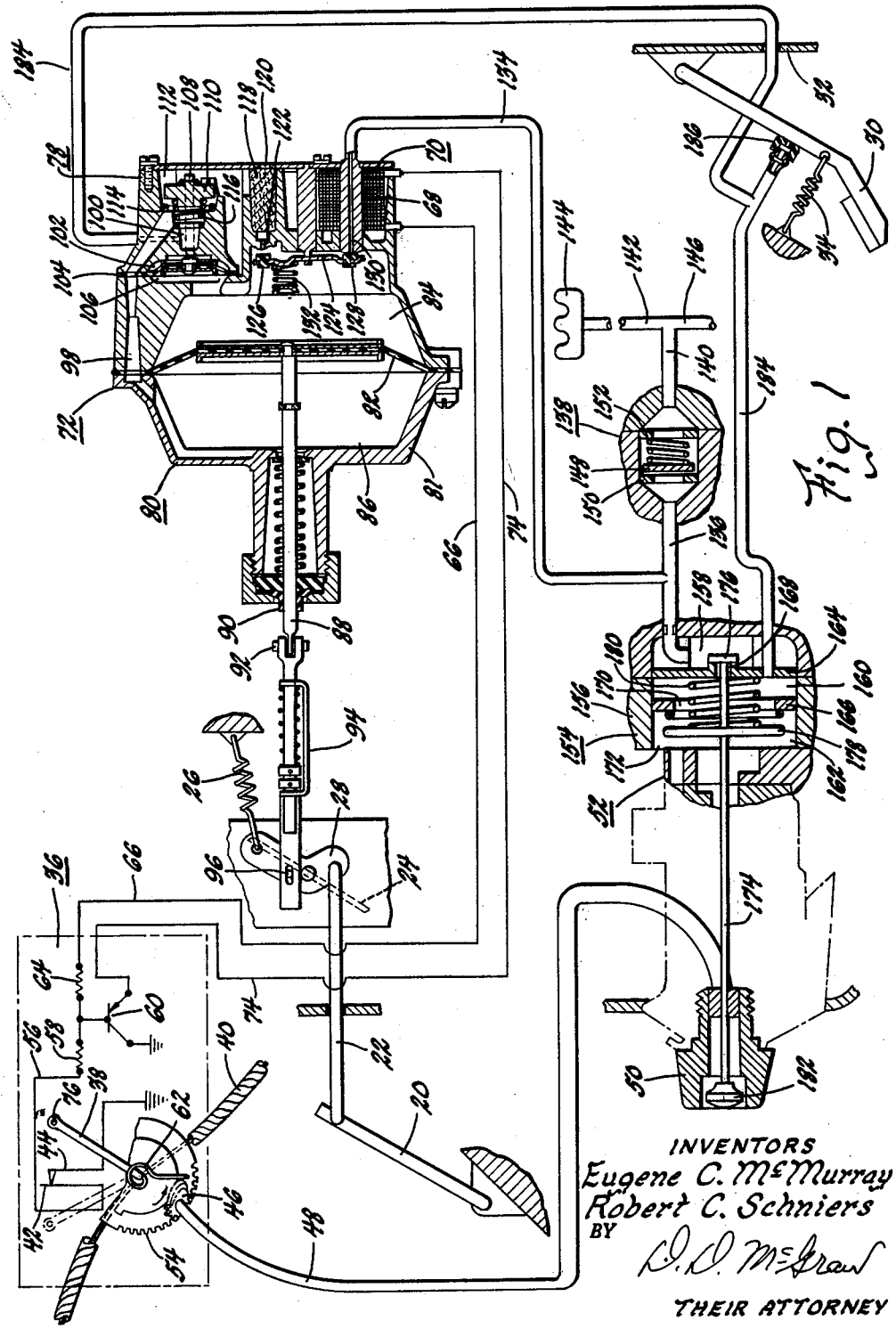

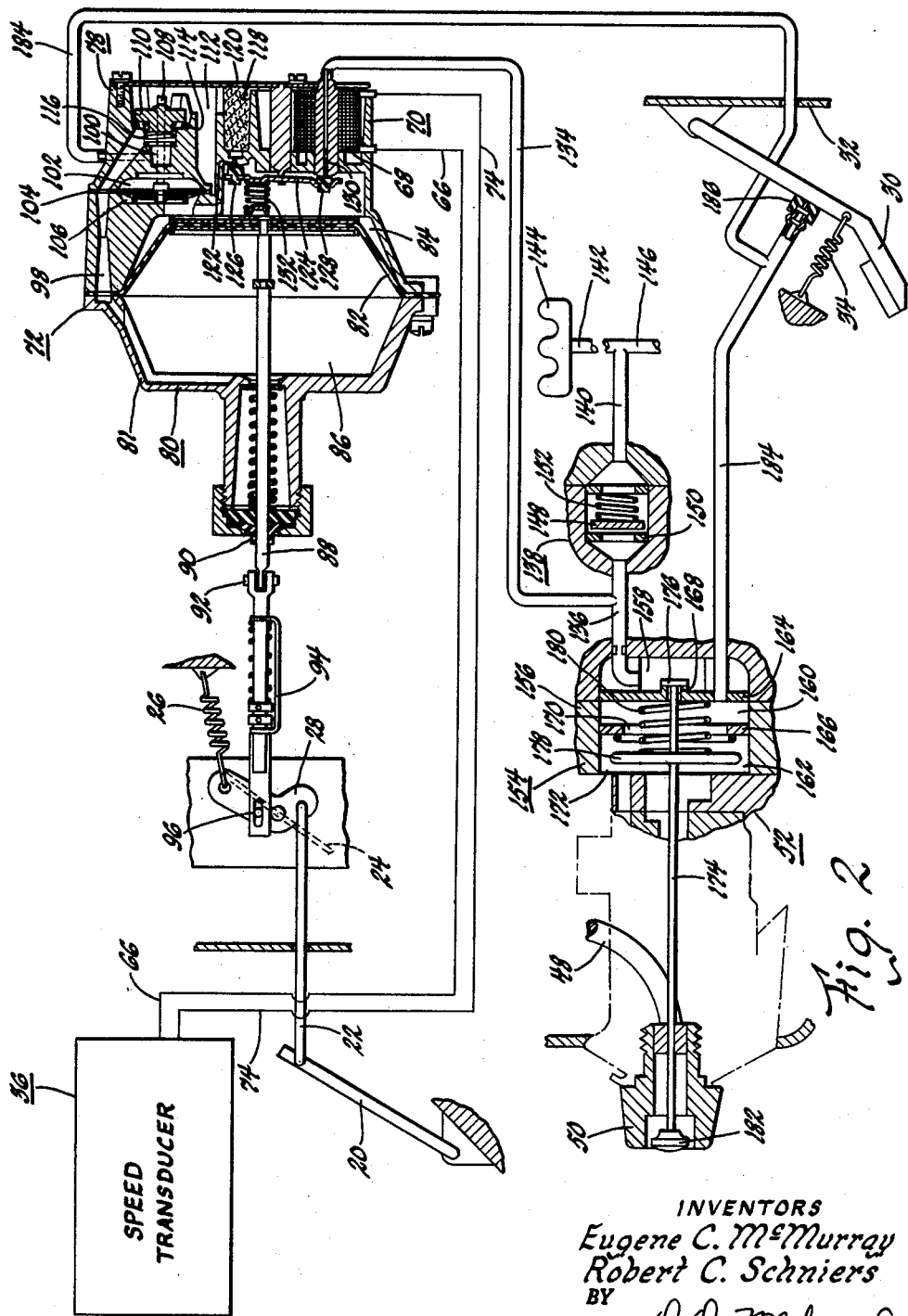

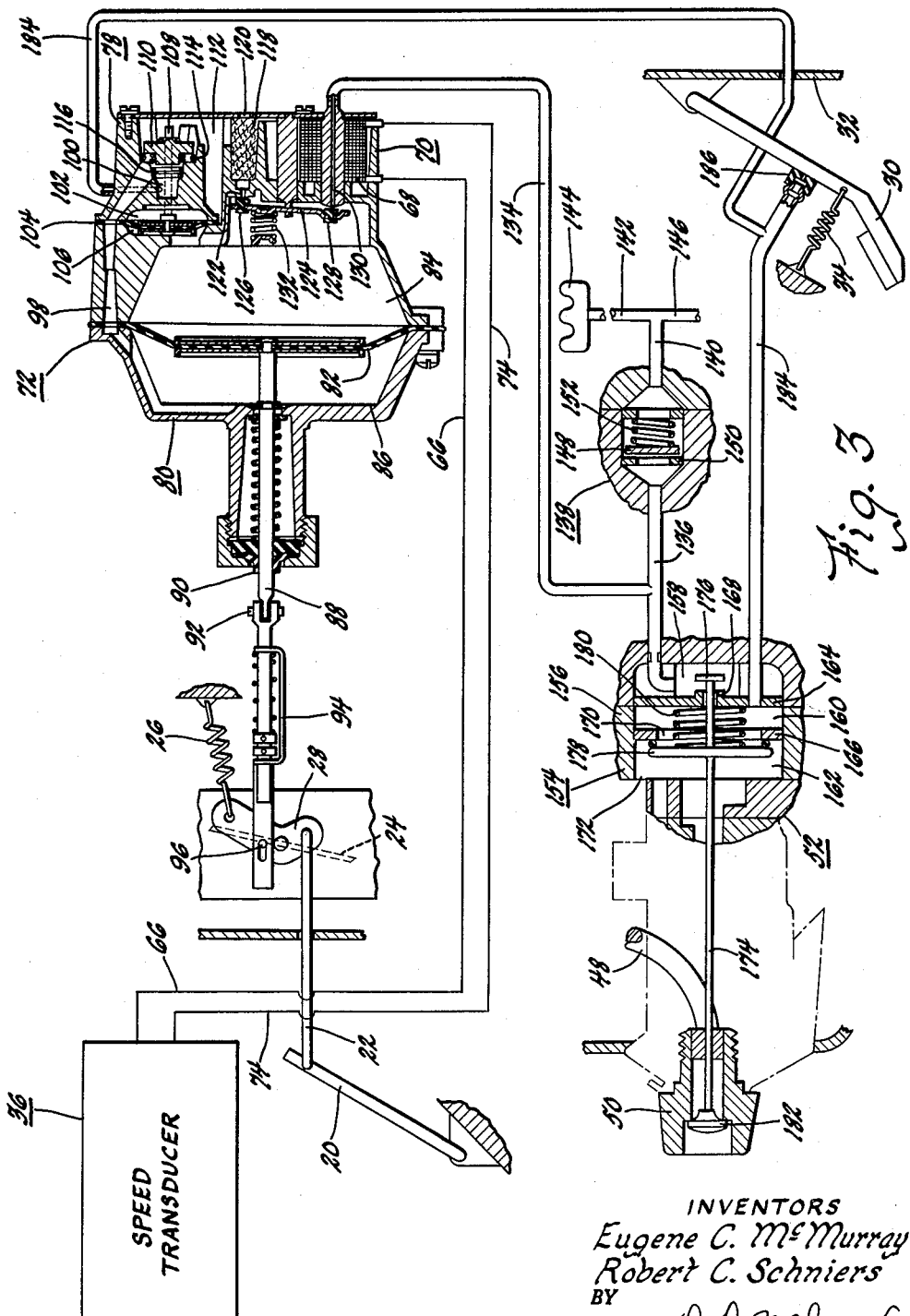

3,157,244
VEHICLE SPEED WARNING AND CRUISE CONTROL SYSTEM WITH PREENGAGEMENT INHIBITING MEANS
Eugene C. McMurray and Robert C. Schniers, Flint, Mich., assignors to General Motors Corporation, Detroit, Mich., a corporation of Delaware
Filed July 23, 1962, Ser. No. 211,491
2 Claims. (Cl. 180—82.1)

The invention relates to a control mechanism for an automotive vehicle and particularly to a mechanism which provides a warning to the vehicle operator when a predetermined vehicle speed is reached in one mode of operation, and another mode of operation maintains the vehicle at a predetermined road speed under varying road conditions. It more particularly relates to such a mechanism which includes means for inhibiting the engagement of the mechanism in the speed maintaining or cruise mode of operation before the vehicle has attained the desired cruise speed.

It has been found to be undersirable under many circumstances to permit a system of this nature to be engaged in the cruise mode at vehicle speeds well below the set speed since such mechanisms may accelerate the vehicle under maximum acceleration conditions until the set speed is reached. If the cruise engage control mechanism is inadvertently actuated as, for example, when the vehicle is stopped at an intersection, the resulting acceleration to a present cruise speed could be dangerous.

It is now proposed to include means for inhibiting the engagement of the mechanism until the set cruise speed is reached. The improved system is generally similar to the system disclosed in the copending application Serial No. 67,820, entitled Vehicle Speed Warning and Cruise Control System, and filed November 7, 1960, and now Patent No. 3,088,538. Reference is therefore made to the disclosure of that application for details of the overall system and in particular for details of operation of the speed transducer mechanism.

In the drawings:

FIGURE 1 is a schematic diagram of a system embodying the invention and showing certain elements thereof broken away and in section. The system is shown in the speed warning mode of operation with the vehicle traveling at a lower speed than the set speed.

FIGURE 2 is similar to FIGURE 1 and shows the system in the speed warning mode of operation with the vehicle tending to overspeed.

FIGURE 3 shows the system in the cruise control mode of operation.

The speed control system illustrated in FIGURE 1 and embodying the invention is shown in the condition of operation wherein the vehicle is traveling at a road speed well below the speed set for warning or cruise mode of operation. The usual accelerator pedal 20 is connected to a throttle rod 22 for control of an engine throttle valve 24 in the well known manner. A throttle return spring 26 is suitably attached to the throttle linkage of which rod 22 is a part and urges the engine throttle valve 24 toward the zero throttle or engine idle position. Arm 28 is attached to the throtle valve so that it moves the valve under influence of throttle rod 22 and spring 26. The usual brake actuating pedal 30 is illustrated as being pivotally attached to the wall 32 and provided with a pedal return spring 34.

The speed transducer 36 is substantially the same as the speed transduced disclosed in the above noted application. It includes an arm 38 which moves under influence of a speed cup driven through drive member 40 in a suitable manner for sensing vehicle speed. Drive member 40 may be a cable such as the usual vehicle speedometer cable. Contacts 42 and 44 are mounted on an oscillating arm which is oscillated through an arc equivalent to a predetermined vehicle speed range as disclosed and described in greater detail in the above noted application. Reference is therefore made to that application and the disclosure is incorporated as if fully reproduced herein. Gear 46 is driven by a suitable drive member 48 from the speed set knob 50 of the control head 52 and meshes with gear segment 54 to determine the set cruise speed or speed warning speed. Contact 42 is in the form of a spring and is connected through an electrical lead 56 and resistor 58 to the transistor 60. A torsion spring 62 is connected to gear segment 54 and resists movement of arm 38 a variable amount depending upon the position of the gear segment, thus providing the mechanism for setting the desired speed. A resistor 64 is connected to transistor 60 at the same point as lead 56 and resistor 58, and also is connected through electrical lead 66 to the coil of an electromagnet assembly 68 which forms a part of the proportional control valve section 70 of the power unit 72. Another electrical lead 74 is connected with the coil of electromagnet assembly 68 and to the transistor 60. As arm 38 moves under increasing vehicle speed influence it enters the oscillation zone of contacts 42 and 44 and a pin 76 extending from the arm engages contact 42 for a proportional period of the oscillating cycle. Pin 76 will hold the contacts open for a predetermined period of time depending upon the vehicle's actual speed relation to the set speed. If the vehicle speed passes beyond the set speed so that it is out of the oscillation zone, contact 42 will be held in such a position that it will not engage contact 44 at any time. The engagement and disengagement of the contacts will cause an electrical speed error signal to be transmitted to the electromagnet assembly 68 and cause a fluid pressure proportional control signal to be generated in the power unit in a manner to be described.

The power unit 72 includes the proportional control valve section 70, the inhibitor section 78 and the power servo section 80. The power servo section includes a housing 81 having a power diaphragm 82 separating the housing into a speed warning chamber 84 and a speed control chamber 86. The servo rod 88 is connected to the diaphragm 82 and extends through a housing wall having a suitable seal 90 therein. Rod 88 is pivotally connected at 92 to a lost motion linkage 94 which is attached to the arm 28 of the throttle valve linkage through a suitable pin and slot arrangement 96. The power servo and associated linkage is substantially the same as that shown in the above noted application.

A passage 98 in the power unit housing connects speed control chamber 86 with the chamber 100 formed in a portion of the housing as a part of the inhibitor section 78. Chamber 100 connects with another chamber 102 formed by a portion of the housing and separated by a diaphragm 104 from a chamber 106 which is in fluid communication with the speed warning chamber 84. A bail 108 is attached to diaphragm 104 and extends through chambers 102 and 100 and includes a strap engageable with the inhibitor valve 110 received in a chamber 112 and extending into chamber 100. A valve seat 114 separates chambers 100 and 112 so that when valve 110 is moved to the left by diaphragm 104 and bail 108 and engages the seat there is no fluid pressure connection between these chambers. Spring 116 urges valve 110 in the normally open position. This spring is easily overcome when there is a decrease in pressure in chamber 106 as the set vehicle speed is reached. Chamber 112 is connected to receive air under atmospheric pressure through filter 118 and inlet 120. Therefore atmospheric pressure acting on valve 110 with sub-atmospheric pressure in chamber 100 holds the valve on its seat even though diaphragm 104 may move bail 108 to the right and out of engagement with the valve 110.

An orifice 122 is provided in the housing wall so that atmospheric air passing through filter 118 can also enter speed warning chamber 84 under controlled conditions. A pivoting valve unit 124 has valve faces 126 and 128 which operate under influence of the speed error signal provided to electromagnet assembly 68 to provide a fluid proportional control pressure in speed warning chamber 84. Valve face 126 is movable upon pivotal movement of valve unit 124 to open and close atmospheric air orifice 122 while valve face 128 moves oppositely to close and open a vacuum orifice 130. A spring 132 urges valve unit 124 to hold valve face 126 against orifice 122 to close that orifice when the coil of electromagnet assembly 68 is not electrically energized. The magnetic force of the electromagnet assembly 68 attracts the end of valve unit 124 on which valve face 128 is mounted when electrically energized to open orifice 122 and close orifice 130. It can be seen that the period of time in which atmospheric air can enter speed warning chamber 84 is determined by the period of energization of electromagnet assembly 68. This assembly is energized at all times when contacts 42 and 44 are closed.

A conduit 134 connects orifice 130 to the vacuum supply conduit 136 which in turn is connected through a check valve assembly 138 and conduits 140 and 142 to a suitable source of vacuum such as the engine intake manifold 144. Conduit 146 may be connected to other suitable vacuum operated accessories on the vehicle. Check valve assembly 138 includes a valve 148, a valve seat 150 and a spring 152 urging the valve against the seat but permitting the valve to be held open where there is a sufficiently low pressure in conduit 140 to operate the remainder of the system. Should the absolute intake manifold pressure momentarily increase to substantially atmospheric pressure so that the control system might not be operative due to a small pressure differential, spring 152 will close valve 148 against seat 150 to hold the vacuum in conduit 136 and other portions of the system openly connected thereto.

The control head 52 includes a control valve assembly 154 having a housing 156 divided into chambes 158, 160 and 162 by walls 164 and 166. An orifice 168 through wall 164 interconnects chambers 158 and 160 and an orifice 170 through wall 166 interconnects chambers 160 and 162. Chamber 162 is vented to the atmosphere at 172. A valve rod 174 extends through orifices 170 and 168 and is provided with a valve 176 which may close orifice 168 and a valve 178 which may close orifice 170. A spring 180 normally holds valve 178 in the open position and valve 176 in the closed position. Rod 174 has a button 182 on its other end which may be recessed in speed set knob 50 and may be pushed inwardly to engage the mechanism in the speed control mode by closing valve 178 against wall 166 and opening valve 176 to respectively close orifice 170 and open orifice 168. This fluid connects chambers 158 and 160 and fluid disconnects chamber 160 from chamber 162.

A conduit 184 is connected with chamber 160 of the control valve assembly 154 and with chamber 100 of the inhibitor section 78 of the power unit 72. A normally closed brake pedal actuated valve 186 is provide in conduit 184 which will open upon movement of the brake pedal 30 to permit atmospheric pressure to enter conduit 184 and therefore chambers 100 and 160.

In the speed warning vehicle under-speed condition illustrated in FIGURE 1 brake valve 186 is closed, contacts 42 and 44 are closed, orifice 170 is open, orifice 168 is closed, check valve 148 is open, valve face 128 is closed against orifice 130, valve orifice 122 is open and valve 110 is unseated. Raw intake manifold vacuum is present in conduits 142, 140, 136 and 134 and chamber 158. Atmospheric pressure is present in chambers 160 and 162, conduit 184, chambers 100 and 112, passage 98, and chambers 84, 86 and 106. Under this condition of operation accelerator pedal 20 is providing the only control of throttle valve 24 in accordance with manual movements of the vehicle operator.

The system is illustrated in FIGURE 2 after the vehicle has reached the set speed for speed warning. In this condition contacts 42 and 44 are open for a proportional period of time, sending a speed error signal to the coil of electromagnet assembly 68, permitting valve face 128 to open orifice 130 in proportion to the signal and to provide a proportionately reduced pressure control signal in speed warning chamber 84. The reduced pressure in this chamber acts on power diaphragm 82 to move servo rod 88 to the right, thereby tending to close throttle valve 24 and exerting a back pressure on accelerator pedal 20 through throttle linkage 22 and 28. This back pressure is felt by the operator's foot as a speed warning.

Should the vehicle operator at this time desire to engage the mechanism in the speed control mode of operation, he presses button 182 so that valve 178 closes orifice 170 to disconnect chamber 160 from the atmospheric pressure of chamber 162 and to open chamber 160 to the reduced pressure in chamber 158 caused by connection with the intake manifold 144. The action of atmospheric pressure in chamber 162 and the reduced pressure in chamber 158 on valve 178 holds the valve closed against the force of spring 180. Since conduit 184 is also connected with chamber 160 it is likewise reduced in pressure, as is chamber 100. The decreased pressure in speed warning chamber 84 acting on diaphragm 104 in chamber 106 will have pulled bail 108 and valve 110 to the left to seat the valve 110 on its seat 114, thereby permitting chamber 100 to be maintained in a reduced pressure condition through conduit 184 since it is then disconnected from chamber 112. The differential pressure acting on valve 110 will hold it against its seat so long as vacuum is maintained in chamber 100 and bail 108 may move relative to valve 110 should diaphragm 104 move. Vacuum is also imposed in speed control chamber 86 through passage 98 and acts on power diaphragm 82. The diaphragm therefore has raw intake manifold vacuum acting on one side of it and a proportional control vacuum acting on the other side. These differential pressures cause movement of rod 88 to move throttle valve 24 and adjust the engine speed so as to maintain the vehicle at the set speed for speed control operation. This condition is illustrated in FIGURE 3.

The general operation of the system is described in greater detail in the above noted application with the exception of the operation of check valve assembly 138 and the inhibitor section 78. It can be seen that the inhibitor section 78 does not permit a reduced pressure to exist in control chamber 86 until after the speed warning chamber 84 has a reduced pressure, which happens only upon the attainment of the set speed. This effectively prevents the system for entering the cruise control condition of operation until the set speed is attained by the vehicle. The engagement of button 182 in an attempt to engage the system in the cruise control mode before the vehicle has reached the set speed would only result in connecting chamber 160 to atmosphere through conduit 184, chamber 100 and chamber 112. The valve 178 would therefore not be held in position since insufficient differential pressure would exist on the opposite sides thereof, and the valve face 128 would continue to be held closed against orifice 130 under influence of the electromagnet assembly 68 so that inhibitor valve 110 could not be seated.

We claim:

1. In a vehicle road speed warning and cruise control system for a vehicle having an engine, said system comprising:

speed error signal generating means, means limiting said generating means speed error signal generation to a predetermined range of vehicle road speed substantially less than the full range of vehicle road speed, means for shifting said predetermined range of vehicle road speed through substantially said full range of vehicle road speed, means receiving said speed error signal and producing therewith a fluid pressure proportional control signal when the actual vehicle road speed is within the predetermined range of vehicle road speed, a servo having opposed fluid pressure chambers separated by a power wall with one chamber fluid connected to said fluid pressure proportional control signal producing means and receiving said signal produced thereby, said servo power wall having means operatively connecting it to the vehicle engine so that said servo controls the engine in response to said fluid pressure proportional control signal, and means selectively introducing a fluid pressure in the other opposed chamber of said servo opposing the fluid pressure proportional control signal and cooperating therewith in actuating said servo to maintain the system in a vehicle road speed cruise control mode;

the improvement comprising, fluid pressure control means connected in fluid flow relation between said servo and said introducing means and responsive to said fluid pressure proportional control signal at said servo and inhibiting introduction of fluid pressure from said introducing means into said servo unless and until said fluid pressure proportional control signal is being received by said servo;

said fluid pressure control inhibiting means including a valve assembly having a first inlet fluid connected to atmospheric pressure and a second inlet fluid connected to said introducing means and a third inlet fluid connected to said one servo opposed chamber and an outlet fluid connected to said other servo opposed chamber, and a valve normally fluid connecting said first and second inlets and operable in response to the fluid pressure proportional control signal in said one servo opposed chamber as received through said third inlet to close said first inlet and fluid connect said second inlet and said outlet.

2. A fluid pressure servo assembly comprising, a housing having a power wall therein dividing said housing into a first fluid pressure chamber and a second fluid pressure chamber, first fluid pressure supply means supplying a fluid pressure different from atmospheric pressure to said first chamber under a predetermined condition, second fluid pressure supply means supplying a second fluid pressure different from atmospheric pressure and from said first fluid pressure, and valve means having a first inlet connected to said first chamber and a second inlet connected to said second fluid pressure supply means and a third inlet connected to atmospheric pressure and an outlet connected to said second chamber and having a pressure responsive valve movable therein in response to fluid pressure received through said first inlet, said valve having one position attained when fluid pressure from said first fluid pressure supply means is not present in said first chamber fluid disconnecting said second inlet and said outlet and fluid connecting said second inlet and said third inlet, said valve having another position attained in response to fluid pressure from said first fluid pressure supply means present in said first chamber fluid connecting said second inlet and said outlet and fluid disconnecting said second inlet and said third inlet.

References Cited in the file of this patent
UNITED STATES PATENTS

| | | |
|---|---|---|
| 2,966,224 | Teetor | Dec. 27, 1960 |
| 3,062,310 | McCathron et al. | Nov. 6, 1962 |